(12) United States Patent
Ahrens

(10) Patent No.: US 7,548,652 B1
(45) Date of Patent: Jun. 16, 2009

(54) RAPID COMPARISON OF SIMILAR DATA STRINGS

(75) Inventor: Richard D. Ahrens, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 741 days.

(21) Appl. No.: 11/117,024

(22) Filed: Apr. 28, 2005

(51) Int. Cl.
G06K 9/72 (2006.01)
H03M 7/34 (2006.01)

(52) U.S. Cl. .......................... 382/229; 341/51
(58) Field of Classification Search ................ 382/170, 382/229; 707/4–5; 341/51
See application file for complete search history.

(56) References Cited

U.S. PATENT DOCUMENTS

| | | | | |
|---|---|---|---|---|
| 4,471,459 A | * | 9/1984 | Dickinson et al. | ........... 715/202 |
| 4,674,066 A | * | 6/1987 | Kucera | ........................ 707/5 |
| 4,876,541 A | * | 10/1989 | Storer | ........................ 341/51 |
| 5,819,291 A | * | 10/1998 | Haimowitz et al. | ......... 707/201 |
| 6,675,171 B2 | * | 1/2004 | Tikkanen et al. | ............ 707/101 |
| 2003/0033501 A1 | * | 2/2003 | Cooke et al. | ................... 712/32 |

OTHER PUBLICATIONS

Cormode, Graham and Muthukrishnan, S., "The String Edit Distance Matching Problem with Moves", http://dimacs.rutgers.edu/~graham/pubs/editmoves.pdf, no date, pp. 10.
Yang, Qi Xiao, Yuan, Sung Sam, Chun, Lu, Zhao, Li, Peng, Sun, "Faster Algorithm of String Comparison", http://arvix.org/abs/cs.DS/0112022, Dec. 25, 2001, p. 1.
Hyyrö, Heikki, "A Bit-Vector Algorithm for Computing Levenshtein and Damerau Edit Distances", Department of Computer and Information Sciences, Prague Stringology conference (PSC'02), Sep. 23-24, 2002, pp. 1-11.
Kukich, Karen, "Techniques for Automatically Correcting Words in Text", ACM Computing Surveys, vol. 24, No. 4, Dec. 1992, pp. 377-439.

(Continued)

*Primary Examiner*—Jingge Wu
*Assistant Examiner*—Hadi Akhavannik
(74) *Attorney, Agent, or Firm*—Marsh Fischmann & Breyfogle LLP; Kent A. Lembke; Peter Meza

(57) ABSTRACT

A comparison routine for comparing two data strings includes pre-processing, copying letters and digits into local buffers, comparing the contents of the local buffers using a left-to-right, walk-forward scanning algorithm, including selecting a first item from each buffer and comparing them and, if the two first items are the same, advancing to the next two items from each buffer, continuing with the comparison of subsequent buffer items until all pairs of items have been compared as long as no mismatch of items is found, and when a mismatch is encountered, the algorithm looks ahead in the data strings, searching for an identifiable pattern. A pair of independent search pointers are initially set to a first character in each data buffer and adjusted if a matching character pattern is found. A processing loop sequentially tests for a number of character patterns. If a matching character pattern is found, the match is scored, incrementing the score by one point for each matching character pattern that is found. If none of the character patterns is found, or the end of either string is reached, the processing loop is exited and the scoring data is collected.

14 Claims, 3 Drawing Sheets

| Ptr1 | curr | next | | | | | | | | | |
|---|---|---|---|---|---|---|---|---|---|---|---|
| Str1 | c | h | a | r | l | e | s | t | o | n | \0 | \0 |
| Str2 | c | a | h | r | l | l | e | t | o | m | \0 | \0 |
| Ptr2 | curr | next | | | | | | | | | |

OTHER PUBLICATIONS

Hauben, Michael and Hauben, Ronda, "On the Early History and Impact of Unix Tools to Build the Tools for a New Millenium", Netizens: On the History and Impact of Usenet and the Internet, Chapter 9, http://www/people.fas.harvard.edu/~lib113/reference/unix/unix9.txt, Jun. 17, 1996, pp. 30.

* cited by examiner

| Ptr1 | curr | next | | | | | | | | | |
|------|------|------|---|---|---|---|---|---|---|---|---|
| Str1 | c | h | a | r | l | e | s | t | o | n | \0 | \0 |
| Str2 | c | a | h | r | l | l | e | t | o | m | \0 | \0 |
| Ptr2 | curr | next | | | | | | | | | |

FIG. 1

| Ptr1 | curr | next | | | | | | | | | |
|------|------|------|---|---|---|---|---|---|---|---|---|
| Str1 | c | h | a | r | l | e | s | t | o | n | \0 | \0 |
| Str2 | c | a | h | r | l | l | e | t | o | m | \0 | \0 |
| Ptr2 | curr | next | | | | | | | | | |

FIG. 2

| Ptr1 | | curr | next | | | | | | | | |
|------|---|------|------|---|---|---|---|---|---|---|---|
| Str1 | c | h | a | r | l | e | s | t | o | n | \0 | \0 |
| Str2 | c | a | h | r | l | l | e | t | o | m | \0 | \0 |
| Ptr2 | | curr | next | | | | | | | | |

FIG. 3

| Ptr1 | | | | curr | next | | | | | | |
|------|---|---|---|------|------|---|---|---|---|---|---|
| Str1 | c | h | a | r | l | e | s | t | o | n | \0 | \0 |
| Str2 | c | a | h | r | l | l | e | t | o | m | \0 | \0 |
| Ptr2 | | | | curr | next | | | | | | |

FIG. 4

| Ptr1 | | | | | curr | next | | | | | |
|------|---|---|---|---|------|------|---|---|---|---|---|
| Str1 | c | h | a | r | l | e | s | t | o | n | \0 | \0 |
| Str2 | c | a | h | r | l | l | e | t | o | m | \0 | \0 |
| Ptr2 | | | | | curr | next | | | | | |

FIG. 5

| Ptr1 |   |   |   |   |   | curr | next |   |   |   |   |
|---|---|---|---|---|---|---|---|---|---|---|---|
| Str1 | c | h | a | r | l | e | s | t | o | n | \0 | \0 |
| Str2 | c | a | h | r | l | l | e | t | o | m | \0 | \0 |
| Ptr2 |   |   |   |   |   | curr | next |   |   |   |   |

FIG. 6

| Ptr1 |   |   |   |   |   | curr | next |   |   |   |   |
|---|---|---|---|---|---|---|---|---|---|---|---|
| Str1 | c | h | a | r | l | e | s | t | o | n | \0 | \0 |
| Str2 | c | a | h | r | l | l | e | t | o | m | \0 | \0 |
| Ptr2 |   |   |   |   |   |   | curr | next |   |   |   |

FIG. 7

| Ptr1 |   |   |   |   |   |   | curr | next |   |   |   |
|---|---|---|---|---|---|---|---|---|---|---|---|
| Str1 | c | h | a | r | l | e | s | t | o | n | \0 | \0 |
| Str2 | c | a | h | r | l | l | e | t | o | m | \0 | \0 |
| Ptr2 |   |   |   |   |   |   |   | curr | next |   |   |

FIG. 8

| Ptr1 |   |   |   |   |   |   | curr | next |   |   |   |
|---|---|---|---|---|---|---|---|---|---|---|---|
| Str1 | c | h | a | r | l | e | s | t | o | n | \0 | \0 |
| Str2 | c | a | h | r | l | l | e | t | o | m | \0 | \0 |
| Ptr2 |   |   |   |   |   |   |   | curr | next |   |   |

FIG. 9

| Ptr1 |   |   |   |   |   |   |   | curr | next |   |   |
|---|---|---|---|---|---|---|---|---|---|---|---|
| Str1 | c | h | a | r | l | e | s | t | o | n | \0 | \0 |
| Str2 | c | a | h | r | l | l | e | t | o | m | \0 | \0 |
| Ptr2 |   |   |   |   |   |   |   |   | curr | next |   |

FIG. 10

| Ptr1 | | | | | | | | | | curr | next | |
|---|---|---|---|---|---|---|---|---|---|---|---|---|
| Str1 | c | h | a | r | l | e | s | t | o | n | \0 | \0 |
| Str2 | c | a | h | r | l | l | e | t | o | m | \0 | \0 |
| Ptr2 | | | | | | | | | | curr | next | |

FIG. 11

| Ptr1 | | | | | | | | | | | curr | next |
|---|---|---|---|---|---|---|---|---|---|---|---|---|
| Str1 | c | h | a | r | l | e | s | t | o | n | \0 | \0 |
| Str2 | c | a | h | r | l | l | e | t | o | m | \0 | \0 |
| Ptr2 | | | | | | | | | | | curr | next |

FIG. 12

RAPID COMPARISON OF SIMILAR DATA STRINGS

BACKGROUND OF THE INVENTION

The present invention relates to the comparison of data strings and the generation of an objective measure of the degree of similarity between the data strings.

Due to inevitable typographic errors, databases tend to become filled with entries that do not quite match. From time to time the data has to be "scrubbed" in order to correct these errors.

If a standard (a collection of correct entries) is available, then finding potentially correct replacements for incorrect entries can be done by comparing the existing entries against each of the standard entries and selecting the standard entry (or entries) that most closely match the existing one. In order to do a useful comparison, a tool is required that can compare strings that may be similar but not necessarily identical and return an objective measure of how similar they are.

There are two primary methods for comparing sequences of values such as character strings, DNA strands, and so forth. These methods are called the "edit distance" and "bipartite comparison" methods.

The edit distance method is based on calculating the cost of transforming one data string into the other. One of the unavoidable limiting factors in the edit distance method is that the entire contents of both strings must be processed in order to return a result.

The bipartite string comparison method provides excellent results. The method is powerful enough to find the word "cyclers" hidden within a word like "acetylcholinesterase" (acetylcholinesterase). But while the bipartite string comparison method is powerful, the method requires an enormously iterative process and is therefore comparatively slow. And, like the edit distance method, the bipartite comparison method requires that the entire contents of both strings must be processed in order to return a result.

What is desired, therefore, is a fast, reliable method for comparing strings and returning a similarity rating that can be used by either a calling routine or a person.

SUMMARY OF THE INVENTION

According to an embodiment of the present invention, a fast, reliable method for comparing strings and returning a similarity rating is provided that can be used by a calling routine and/or by a human operator. The scoring of the similarity rating is objective, and also meaningful to a person who may need to make a final determination by choosing from several possible matches returned by the program of the present invention.

The method of the present invention provides a quick comparison of matching or nearly matching strings that can be used as either a method of rapidly eliminating anomalous entries, or a first pass in a correction process where additional software can perform further processing and a person can make the final decisions in cases that are not clear cut.

The method of the present invention exploits the fact that even the incorrect entries in a database still tend to be similar to the intended entries. It is known that approximately 80% of all misspelled words contain a single instance of one of the following four error types: insertion, deletion, substitution, and transposition. By limiting the domain of the problem to searching for just these four most common errors, the method of the present invention can be limited to a simple, left-to-right scan. This allows the processing of identical strings almost as fast as the C standard library routine strcmp( ). The processing of non-identical strings takes somewhat longer.

According to the method of the present invention, a comparison routine for objectively comparing two data strings includes pre-processing two input strings to eliminate spacing and punctuation differences, copying letters and digits from the input strings into local buffers, comparing the contents of the local buffers using a left-to-right, walk-forward scanning algorithm, including selecting a first item from each buffer and comparing them and, if the two first items are the same, advancing to the next two items from each buffer, continuing with the comparison of subsequent buffer items until all pairs of items have been compared as long as no mismatch of items is found, and when a mismatch is encountered, looking ahead in each of the buffer contents, searching for a pair of entries that do match. Optional pre-processing of the two input strings commonly includes recasing text, eliminating punctuation and white spaces, or removal of any characters which are not significant to the comparison. The only part of the pre-processing which is mandatory is filling the unused buffer locations with null characters. The method of the present invention includes a pair of independent search pointers that are initially set to a first character in each data buffer and adjusted if a match or an identifiable character pattern is found. The method of the present invention includes a processing loop that sequentially tests for a plurality of character patterns including a character match, a transposition character pattern, an insertion character pattern, an elision character pattern, and a substitution character pattern. If a matching character is found, the match is scored, incrementing the score by one point for each matching character that is found. If neither a match nor any of the other character patterns is found, the processing loop is exited and the scoring data is collected.

BRIEF DESCRIPTION OF THE DRAWINGS

The aforementioned and other features and objects of the present invention and the manner of attaining them will become more apparent and the invention itself will be best understood by reference to the following description of a preferred embodiment taken in conjunction with the accompanying drawings, wherein:

FIGS. 1-12 show the sequential comparison of two data strings in a step-by-step application of the method of the present invention, wherein two pointers "walk forward" from left to right as the data strings are compared.

DETAILED DESCRIPTION OF A PREFERRED EMBODIMENT

The TIES ("Transposition/Insertion/Elision/Substitution") comparison routine of an embodiment of the present invention can be used to compare raw data strings, but in most practical applications there is usually some sort of pre-processing done to eliminate insignificant variations such as mismatches in case or punctuation.

The kind of pre-processing that is done can vary based on the kind of text to be compared and the objective of the comparison. In an embodiment of the present invention, the program removes blanks and punctuation, and converts all letters to lower case as the strings are copied into local buffers.

Once the pre-processing is done, the TIES routine compares the contents of the local buffers using a simple left-to-right, walk-forward scanning algorithm. Since the TIES algorithm always has the same starting state, five possible patterns, and only two possible ending conditions, this makes it a good candidate for implementation as an FSM, a Finite State Machine, which can rapidly traverse the strings to be compared with a relatively low number of iterations. The edit-distance and bipartite comparisons can also be implemented as FSM's, but there is no way to reduce the relatively high number of iterations required by these methods.

A "walk-forward" algorithm, such as that implemented in the present invention, takes the first item from each buffer and compares them. If the items are the same, the algorithm advances to the next two items. So long as no mismatch is found, the algorithm continues until all the pairs in each of the data strings have been compared. When a mismatch is encountered, the algorithm looks ahead in the data strings, searching for an identifiable pattern. This allows the program to decide what sort of mismatch it has encountered and what to do about it.

The Unix "differences" program uses a similar walk-forward algorithm. Using file lines that match as anchor points, it is able to identify and display the sections of two files that do not match. However, the Unix "differences" program uses an unbounded look ahead (which can be costly in terms of search time). The method of the present invention uses a look ahead that is never more than two locations deep to gain computing speed. The shorter look ahead derives from the limits placed on the kind of errors the TIES algorithm looks for. This is explained in greater detail below.

It is important to note that in the method of the present invention the walk-forward algorithm uses search pointers that move independently. That is, even though the pointers start "together" with pointer A aimed at the first item in buffer A and pointer B aimed at the first item in buffer B, the subsequent movements of the pointers are not linked to each other. The search pointers are moved forward independently by the rules of the search engine. (In many cases, the search pointers seem to take turns moving ahead of one another; hence the term "walk-forward".)

Examples of several string pairs are shown and described below:

| | | |
|---|---|---|
| 1. Complete Match: | this/this | |
| 2. Partial Match: | autumn/author | |
| 3. No match: | green/coats | |
| 4. Substitution: | definitely/definately | |
| 5. Elision: | amoeba/ameba | |
| 6. Transposition: | example/exmaple | |
| 7. Insertion: | traveler/traveller | |

Pre-processing the raw data strings—removing characters that make no difference to the comparison, recasing letters and so on—keeps the comparison logic simple and fast. The pre-processor also fills the unused buffer locations with null characters. The null characters simplify detecting exit conditions. The null characters also simplify (and significantly speed up) processing by eliminating the need for different rules when handling end-of-string comparisons.

The pre-processing routines used can be varied according to specific needs, allowing the comparison routine to be easily adapted to a variety of different uses without necessitating modification of the TIES algorithm itself. In some comparisons, it may be appropriate to compare the raw strings just as they are. In this case the preprocessing can be limited to simply null-filling the unused locations in the arrays that hold the strings.

Once the comparison buffers are loaded, search pointers are set to the first character in each buffer, and processing begins. The processing loop sequentially tests for one of five patterns. If a matching pattern is found, the appropriate action for adjusting the search pointers and scoring is applied. If none of the five patterns is found, then the comparison loop is exited and the scoring data collected is normalized for return to the calling routine.

For simplicity's sake, the character in buffer 1 to which the first search pointer currently points is referred to as A1. The character after it, A2, and so on. Similarly, the character in buffer 2 to which the second search pointer currently points is referred to as B1 and the characters after it, B2, et cetera. Whenever one of the search pointers moved, then the ensuing references will adjust accordingly.

The longest character pattern (transposition) is two characters long. This means that the algorithm implemented in the method of the present invention need never look more than one character beyond the current search pointers.

The five patterns are:
1. Equality—A1 equals B1 (the first characters match)
2. Substitution—A2 equals B2 (the second characters match)
3. Transposition—A1 equals B2 and A2 equals B1 (The two characters in buffer 1 are the same as the two character's in buffer 2, but they are not in the same order.)
4. Elision—A1 equals B2
5. Insertion—B1 equals A2

The search for the five patterns are implemented in an "if . . . else if" fashion. In this way each test builds on the previous one. Thus by the time we get to test 2, we already know that A1 is not equal to B1 because if it had been, the second test would not be performed. Likewise, by the time we get to test 3, we know that A1 is not equal to B1 and A2 is not equal to B2.

In pseudo-code, the pattern search processing loop can be written as follows:

loop:

```
{
if (A1 is null or B1 is null)          // we have run out of
   exit the loop                       // meaningful comparisons
if (A1 equals B1)                      // the characters match
   {
   increase the score by 1             // count the match
   move A1 and B1 forward by one       // step to next pair
   }
else if (A2 equals B2)                 // substitution detected in A1/B1
   {
   move A1 and B1 forward by one       // and step over it
   }
else if (A1 equals B2 and              // transposition detected
      A2 equals B1)
   {
   increase the score by 1             // count the jumbled match
   move A1 and B1 forward by two       // and step over it
   }
else if (A1 equals B2)                 // elision detected in A
   {                                   // or insertion in B
   move B1 forward by one              // so re-align pointer B
   }
else if (B1 equals A2 and              // insertion detected in A
                                       // or elision in B
   move A1 forward by one              // re-align pointer A
   }
else                                   // we have found a section of
   exit the loop                       // significant differences
}
```

Once the scanning is completed, the final score is 100.0*(score/maxlen)

where maxlen is the greater of the lengths of the two comparison strings.

An embodiment of the method of the present coded in C is as follows:

```c
#include <stdlib.h>
#include <stdio.h>
#define MAXBUF 2000
#define TIESBUF 2000
float tiesCompare (char *, char *);
/***************************************************************
**************
* driver program for tiesCompare( ). after compiling the program   *
*   with cc -o ties ties.c                                         *
* you can see how the scoring algorithm works by providing strings *
* for it as command-line arguments, for example:                   *
*   $ ties this this                                               *
*   100.00% match                                                  *
****************************************************************
**************/
main(int argc, char *argv[ ])
{
    if (argc != 3)
    {
        fprintf(stderr, "ties str1 str2\n");
        exit(1);
    }
    printf("%1.2f%% match\n", tiesCompare(argv[1], argv[2]));
    return 0;
}
/***************************************************************
**************
*                                                                  *
* tiesCompare                                                      *
*                                                                  *
* compares two strings and returns a score (from 0 to 100)         *
* indicating how similar they are. 100 indicates both strings      *
* contained exactly the same letters and digits occurring in the same *
* order. (However, this does not mean the strings are identical.)  *
*                                                                  *
* In this example routine the preprocessing of the strings makes   *
* the comparison case insensitive and ignores both whitespace and  *
* punctuation. In a production environment, where large arrays of  *
* strings are often compared each against the other, it is much    *
* faster to remove the preprocessing from the tiesCompare routine  *
* and do it all at once before starting the comparison process.    *
*                                                                  *
* the comparison algorithm is designed to navigate the most        *
* common typos - transposition/insertion/elision/substitution - made *
* by people while doing data entry. for speed, it uses a left to right, *
* walkforward scanning algorithm implemented as a finite state     *
* machine, it can negotiate and evaluate any number of these four  *
* simple typos in the strings.                                     *
*                                                                  *
* version 1.5        05 Mar 2005        r. d. ahrens                *
*                                                                  *
****************************************************************
**************/
float tiesCompare (char *in1, char *in2)
{
    char str1[TIESBUF], str2[TIESBUF];
    char *s1c, *s2c;              // string 1,2 current position
    char *s1n, *s2n;              // string 1,2 next position
    char *src, *dst;              // "copying" pointers
    long len1, len2;              // length of string 1,2
    long c, maxlen;
    float score;
    /***************************************************************
    ******
    * zero the comparison buffers                                  *
    ****************************************************************
    ******/
    for (c = 0; c < TIESBUF; c++)
        str1[c] = str2[c] = '\0';
    /***************************************************************
    ******
    * copy the first string (minus whitespace and punctuation)     *
    ****************************************************************
    ******/
    src = in1;
    dst = str1;
    while (*src)
    {
        if (*src >= 'a' && *src <= 'z')          // copy the letters
        {
            *dst = *src;
            dst++;
        }
        else if (*src >= 'A' && *src <= 'Z')     // change caps to lower case
        {
            *dst = *src + 32;
            dst++;
        }
        else if (*src >= '0' && *src <= '9')     // and copy the digits
        {
            *dst = *src;
            dst++;
        }
        src++;                                   // ignore everything else
    }
    len1 = dst - str1;
    /***************************************************************
    ******
    * copy the second string (minus whitespace and punctuation)    *
    ****************************************************************
    ******/
    src = in2;
    dst = str2;
    while (*src)
    {
        if (*src >= 'a' && *src <= 'z')          // copy the letters
        {
            .*dst = *src;
            dst++;
        }
        else if (*src >= 'A' && *src <= 'Z')     // change caps to lower case
        {
            *dst = *src + 32;
            dst++;
        }
        else if (*src >= '0' && *src <= '9')     // and copy the digits
        {
            *dst = *src;
            dst++;
        }
        src++;                                   // ignore everything else
    }
    len2 = dst - str2;
    /***************************************************************
    ******
    * compare the pre-processed strings                            *
    ****************************************************************
    ******/
    s1c = str1;                        // set the search
    s2c = str2;                        // pointers and
    score = 0.0;                       // length and score
    while (*s1c && *s2c)               // if either s1c or s2c points
    {                                  // to a null char, exit
        s1n = s1c + 1;
        s2n = s2c + 1;                 // update the next pointers
        if (*s1c == *s2c)              // the current
        {                              // characters
            s1c++;                     // match so just
            s2c++;                     // move everything
            score++;                   // along
        }
        else if (*s1n == *s2n)         // substitution
        {                              // (the current chars don't
            s1c++;                     // match but the next two
            s2c++;                     // do, so step over the error
        }
        else if (*s1c == *s2n &&       // transposition
                 *s2c == *s1n)         // (curr1 and next2 match
        {                              //and so do curr2 and next1)
            s1c += 2;
            s2c += 2;
            score++;                   // "half" score since two
        }                              // skipped
        else if (*s1c == *s2n)         // elision/insertion
            s2c++;
        else if (*s2c == *s1n)         // elision/insertion
            s1c++;
        else                           // no match at all, so
```

-continued

```
    break;                      // leave the loop
  }
  maxlen = len1;                // get the longer of the two string lengths
    if (len2 > maxlen)
    maxlen = len2;
  return 100.0 * (score / maxlen);
}
```

In a current application, the algorithm of the method of the present invention is used to compare company names in one database against a list of 50,000 company names from another. Running on an UltraSPARC-II computer with a clock speed of 400 MHz, the program is able to compare a candidate company name against 50,000 standard company names in 7.2 seconds without any optimization steps taken.

Profiling shows that the pre-processing steps take about 60% of the run-time. For ongoing applications it is desirable to pre-process the names in both datasets at the beginning of the main program.

Using the program shown above, some examples of the scores produced when comparing various string pairs are given below.

$ ties this this
100.00% match
$ ties more mroe
75.00% match
$ ties more moore
80.00% match
$ ties autumn author
50.00% match
$ ties green coats
0.00% match
$ ties amoeba ameba
83.33% match
$ ties example exmaple
85.71% match
$ ties traveler traveller
88.89% match
$ ties definately definitely
90.00% match The advantage of setting up the scoring in this way is that when a person has to make a final decision between several possible matches returned by the program, the scores match or at least approximate the scores a person would give if they had to do the entire process by hand. In other words, the scores make intuitive sense and do not require a person to realign their intuitive thinking in order to work with the data.

Referring generally now to FIGS. 1-12, a step-by-step examination of the method of the present invention is shown and described. In order to illustrate how the TIES algorithm works, two data strings are compared: "Charleston" and a rather mangled version of the same word, "cahrlletom". The second data string is similar to the first but it contains one occurrence of each of the four typographic errors that the TIES algorithm is designed to navigate—transposition (the 'a' and 'h' are reversed), insertion (an extra 'l'), elision (the 's' is missing), and substitution (the 'n' in the first string is replaced with an 'm' in the second).

It is important to note that in the method of the present invention, the data string buffers are at least two characters longer than any string to be evaluated, and that all the locations in the comparison buffers are filled with null bytes (zeros) before the strings are copied in. These two features work together to allow the method of the present invention to work without having to do any sort of special checking when the comparison approaches the ends of the strings.

In the example, the 'current' and 'next' pointers are labeled as 'curr' and 'next'. These abbreviated names are followed by either a '1' or '2' in the descriptive text to indicate whether they are the pointers for the first string (Str1) or the second string (Str2).

Referring now to FIG. 1, an initialization step is shown. Once the strings have been loaded into the comparison buffers, the 'current' and 'next' pointers are set to point to the first two characters in each string. The score is set to zero.

Referring now to FIG. 2, the processing loop is started and a first step within the processing loop is begun. Then the processing loop goes to work. Note that the characters in locations 'curr1' and 'curr2' are the same. Therefore, the score is incremented to 1 and both the Str1 and Str2 pointers are advanced.

Referring now to FIG. 3, a second step within the processing loop is performed. In the second step shown in FIG. 3, the 'current' characters are not the same, and neither are the 'next' characters. But 'curr1' is the same as 'next2' and 'curr2' is the same as 'next1' so the algorithm used in the method of the present invention identifies this as a transposition. The score is incremented by one (to 2) but advances the pointers by two. This effectively scores a transposition as one-half point for each of the two characters.

Referring now to FIG. 4, a third step within the processing loop is performed. Note that the 'current' characters are the same, and so the score is incremented to 3 and the pointers are advanced.

Referring now to FIG. 5, a fourth step within the processing loop is performed. Note that the 'current' characters are again the same and so the score is incremented to 4 and the pointers are advanced.

Referring now to FIG. 6, a fifth step within the processing loop is performed. In FIG. 6, the 'current' characters are not the same, and neither are the 'next' characters. But 'current1' is the same as 'next2' so this is identified as an insertion in Str2. The program increments the pointers to Str2 but does not increment the score.

Referring now to FIG. 7, a sixth step within the processing loop is performed. Note that the 'current' characters are the same and so the score is incremented to 5 and the pointers are advanced.

Referring now to FIG. 8, a seventh step within the processing loop is performed. Note that current1 does not match current2, but next1 matches current2. This is identified as an elision from Str2, and so the Str1 pointers are incremented but nothing else is changed.

Referring now to FIG. 9, an eighth step within the processing loop is performed. Note that the 'current' characters are the same and so the score is incremented to 6 and the pointers are advanced.

Referring now to FIG. 10, a ninth step within the processing loop is performed. Note that the 'current' characters are again the same and so the score is incremented to 7 and the pointers are advanced.

Referring now to FIG. 11, a tenth step within the processing loop is performed. Note that the 'current' characters are not the same, but the 'next' characters are the same (null bytes are compared just like other characters so the algorithm does not have to have special tests for handling end-of-string differences like this one). This situation identifies a substitution so both sets of pointers are advanced but the score is not changed.

Referring now to FIG. 12, an eleventh and final step is performed. When either curr1 or curr2 point to a null byte, the comparison is over. Once the processing loop is exited, then the final rating for the comparison is computed as the ratio of the score (7) versus the length of the longer of the two strings (10) or 70%.

While there have been described above the principles of the present invention in conjunction with specific components, circuitry and bias techniques, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features which are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The applicants hereby reserve the right to formulate new claims to such features and/or combinations of such features during the prosecution of the present application or of any further application derived therefrom.

I claim:

1. A computer-based method for objectively comparing two data strings in a database comprising:
   with a computer running program code defining a pre-processing routine, pre-processing the two input strings including storing the two data strings in local buffers of memory accessible by the computer; and
   with the computer running program code defining a pattern search processing loop, comparing the contents of the local buffers using a walk-forward scanning algorithm, wherein the comparing comprises providing a pair of search pointers for each of the data strings pointing to two characters in each of the data strings, performing a comparison loop using the two characters in each of the data strings to search for one of a set of character patterns, and exiting the comparison loop when the search fails to identify one of the set of character patterns, whereby the comparing of the two data strings uses a look ahead that does not exceed two locations to enhance computing, wherein the set of character patterns comprise a character equality pattern, a transposition character pattern, an insertion character pattern, an elision character pattern, and a substitution character pattern and wherein the comparing is performed sequentially with the character equality pattern being performed before the substitution character pattern and the substitution character pattern being performed before the transposition pattern.

2. The method of claim 1 wherein pre-processing the two input strings comprises recasing text, eliminating punctuation and white spaces, removing other unwanted characters, or filling unused buffer locations with null characters.

3. The method of claim 1 wherein the pairs of search pointers are positioned independently relative to the data strings.

4. The method of claim 3 further comprising setting one of each of the search pointer pairs to a first character in each data string.

5. The method of claim 1 further comprising, if a matching character pattern is found, adjusting the search pointers.

6. The method of claim 1 further comprising, if a matching character pattern is found, scoring the match.

7. The method of claim 1 further comprising, if none of the character patterns is found or if the end of either string is reached, collecting scoring data.

8. The method of claim 1 further comprising incrementing a score by one point for each matching character pattern.

9. A computer readable medium for providing a comparison routine for objectively comparing two data strings comprising:
   program code readable by a computer configured to cause the computer to effect copying of the data strings into local buffers of the computer; and
   program code readable by a computer configured to cause the computer to effect comparing the contents of the local buffers using a walk-forward scanning algorithm, wherein the comparing comprises repeating a processing loop for characters in each of the data strings corresponding to current search pointer positions, the processing loop comprising sequentially testing for a set of character patterns and exiting the processing loop after the testing identifies one of the character patterns or terminating the comparing when the testing identifies none of the character patterns, wherein the set of character patterns comprise a character equality pattern, a transposition character pattern, an insertion character pattern, an elision character pattern, and a substitution character pattern and wherein the testing is performed sequentially with the character equality pattern being performed before the substitution character pattern and the substitution character pattern being performed before the transposition pattern.

10. The computer readable medium of claim 9 further comprising, if a matching character pattern is found, adjusting the search pointers.

11. The computer readable medium of claim 9 further comprising, if a matching character pattern is found, scoring the match.

12. A method for objectively comparing two data strings comprising:
   with a computer running a coded software program, copying letters and digits from the input data strings into local buffers of memory;
   with the computer, comparing the contents of the local buffers using a walk-forward scanning algorithm, including a pair of independent search pointers for each of the input strings; and
   with the computer, providing a processing loop that sequentially tests for a plurality of character patterns and, if a matching character pattern is found, adjusting the search pointers, scoring the match, and, based on the scoring, outputting a score for the match, wherein the plurality of character patterns includes a character equality pattern, a transposition character pattern, an insertion character pattern, an elision character pattern, and a substitution character pattern and wherein the testing is performed by the computer such that the character equality pattern being performed before the substitution character pattern and the substitution character pattern being performed before the transposition pattern.

13. The method of claim 12 wherein the testing for the character patterns is performed using a set of characters associated with the search pointers and wherein the comparing is halted when the testing fails to identify any of the character patterns in the set of characters.

14. The method of claim 12 further comprising pre-processing the two input strings.

* * * * *